US012377475B2

(12) United States Patent
Chen et al.

(10) Patent No.: US 12,377,475 B2
(45) Date of Patent: Aug. 5, 2025

(54) BELT-TRANSMISSION ANGLE ATTACHMENT HEAD

(71) Applicant: KEDE NUMERICAL CONTROL CO., LTD., Liaoning (CN)

(72) Inventors: Hu Chen, Liaoning (CN); Xin Deng, Liaoning (CN); Changlin Du, Liaoning (CN); Cuijuan Guo, Liaoning (CN); Yapeng Li, Liaoning (CN); Haibo Zhang, Liaoning (CN); Zhihong Wei, Liaoning (CN); Hongwei Sun, Liaoning (CN); Guoshuai Zhang, Liaoning (CN); Mingshan Song, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 550 days.

(21) Appl. No.: 17/788,899

(22) PCT Filed: Nov. 27, 2020

(86) PCT No.: PCT/CN2020/132120
§ 371 (c)(1),
(2) Date: Jun. 24, 2022

(87) PCT Pub. No.: WO2021/135759
PCT Pub. Date: Jul. 8, 2021

(65) Prior Publication Data
US 2023/0032515 A1   Feb. 2, 2023

(30) Foreign Application Priority Data
Dec. 31, 2019   (CN) .......................... 201911419347.9

(51) Int. Cl.
*B23C 1/12*   (2006.01)
*B23Q 1/52*   (2006.01)
(Continued)

(52) U.S. Cl.
CPC ................. *B23C 1/12* (2013.01); *B23Q 1/52* (2013.01); *B23Q 5/043* (2013.01); *B23Q 5/10* (2013.01);
(Continued)

(58) Field of Classification Search
CPC . B23Q 1/70; B23Q 1/52; B23Q 5/043; B23Q 5/045; B23Q 5/20; B23Q 5/36;
(Continued)

(56) References Cited

U.S. PATENT DOCUMENTS

| | | | |
|---|---|---|---|
| 2001/0046422 A1* | 11/2001 | Colombo | B23Q 5/045 409/211 |
| 2010/0206599 A1* | 8/2010 | Sugiyama | B23Q 16/025 409/201 |
| 2012/0103127 A1* | 5/2012 | Liu | B25J 17/0283 74/423 |

FOREIGN PATENT DOCUMENTS

| | | |
|---|---|---|
| CH | 686818 A5 * | 7/1996 |
| CN | 102019636 B * | 11/2012 |

(Continued)

OTHER PUBLICATIONS

Computer translated CN-102019636-B (Year: 2012).*
(Continued)

*Primary Examiner* — Erica E Cadugan
(74) *Attorney, Agent, or Firm* — MUNCY, GEISSLER, OLDS & LOWE, P.C.

(57) ABSTRACT

The present invention discloses a belt-transmission angle attachment head, including a housing, a power mechanism, a transmission mechanism and a spindle; the power mechanism and transmission mechanism are arranged in the housing; the power mechanism includes a servo motor and a reducer, the servo motor is connected to the reducer, and an input shaft of the reducer is vertically arranged with respect to an output shaft of the reducer; the transmission mecha-
(Continued)

nism includes a driving wheel, a transmission belt and a driven wheel, and the driving wheel is mounted on the output shaft of the reducer; a side of the spindle is mounted on the housing via a rotating shaft, an end of the rotating shaft away from the spindle is mounted with the driven wheel, the driving wheel and the driven wheel are connected via the transmission belt, and the spindle and the power mechanism are located on the same side of the transmission mechanism. The angle attachment head has advantages such as small size, simple structure and suitable for deep cavity machining.

6 Claims, 3 Drawing Sheets

(51) Int. Cl.
  *B23Q 5/04* (2006.01)
  *B23Q 5/10* (2006.01)
  *B23Q 5/20* (2006.01)
  *B23Q 1/70* (2006.01)

(52) U.S. Cl.
  CPC ............... *B23Q 5/20* (2013.01); *B23Q 1/70* (2013.01); *B23Q 5/045* (2013.01); *B23Q 2220/006* (2013.01); *Y10T 409/307672* (2015.01)

(58) Field of Classification Search
  CPC . B23Q 1/50–1/527; Y10T 409/308672; Y10T 409/308512; Y10T 409/307672; Y10T 409/308232; Y10T 408/93–935; B23C 1/12
  USPC .................. 409/201, 211, 216; 408/236–237
  See application file for complete search history.

(56) References Cited

FOREIGN PATENT DOCUMENTS

| | | | |
|---|---|---|---|
| CN | 207189865 U | * | 4/2018 |
| CN | 207372313 U | * | 5/2018 |
| CN | 108500706 A | * | 9/2018 |
| CN | 108580938 A | * | 9/2018 |
| CN | 208246273 U | * | 12/2018 |
| CN | 211727508 U | * | 10/2020 |
| CN | 111922739 A | * | 11/2020 |
| DE | 202009014940 U1 | * | 11/2010 |
| DE | 202012006212 U1 | * | 10/2012 |
| EP | 1036629 A2 | * | 9/2000 |
| EP | 2335865 A1 | * | 6/2011 |
| JP | 5207272 B2 | * | 6/2013 ........... B23Q 1/5406 |

OTHER PUBLICATIONS

Computer translated JP-5207272-B2 (Year: 2007).*
Machine Translation of CH 686818 A5, which CH '818 was published Jul. 15, 1996.*

* cited by examiner

BELT-TRANSMISSION ANGLE ATTACHMENT HEAD

TECHNICAL FIELD

The present invention relates to the technical field of machine tool spindles, particularly, to a belt-transmission angle attachment head.

BACKGROUND ART

In fields such as aviation and national defense, deep cavity machining is often required. However, the existing machine tool spindle is generally mounted on a machine tool at a fixed angle, or the angle needs to be adjusted manually, resulting in a bulky volume, and thus, the existing machine tool spindle is not suitable for machining deep cavity structures with narrow space.

SUMMARY OF INVENTION

The present invention proposes a belt-transmission angle attachment head, which solves the problem that the existing machine tool attachment head is bulky in volume, complex in structure and unsuitable for deep cavity machining.

The technical means adopted in the present invention are as follows: a belt-transmission angle attachment head, including: a housing, a power mechanism, a transmission mechanism, and a spindle, with the power mechanism and transmission mechanism arranged in the housing;

- the power mechanism includes a servo motor and a reducer, the servo motor is connected to the reducer, and an input shaft of the reducer is vertically arranged with respect to an output shaft of the reducer;
- the transmission mechanism includes a driving wheel, a transmission belt and a driven wheel, and the driving wheel is mounted on the output shaft of the reducer; and
- a side of the spindle is mounted on the housing via a rotating shaft, an end of the rotating shaft away from the spindle is mounted with the driven wheel, the driving wheel and the driven wheel are connected via the transmission belt, and the spindle and the power mechanism are located on the same side of the transmission mechanism.

Further, an end of the housing is a spindle mounting end; the spindle mounting end is provided with a spindle mounting portion; the spindle is mounted on the spindle mounting portion via the rotating shaft; and the spindle and the driven wheel are arranged on two sides of the spindle mounting portion.

Further, a side of the spindle mounting portion provided with the driven wheel is also mounted with a clamping device for clamping the spindle; and the clamping device is arranged between the spindle mounting portion and the driven wheel.

Further, the clamping device is a pneumatic shaft clamping device.

Further, an end of the rotating shaft connected to the spindle is provided with a fixed plate; the rotating shaft is fixedly connected to the spindle via the fixed plate; and a side of the fixed plate facing the driven wheel is mounted with an angle measuring system for measuring a swinging angle of the spindle.

Further, the angle measuring system includes a circular grating and a reading head; the circular grating is mounted on the fixed plate; and the reading head is mounted on the spindle mounting portion.

Further, a side of the spindle mounting portion facing the spindle is also provided with an angle measuring system accommodating cavity; the reading head is mounted on an inner wall of the angle measuring system accommodating cavity; and the circular grating is mounted on the fixed plate, and in the direction of the axis of the rotating shaft, part of the circular grating is arranged in the angle measuring system accommodating cavity.

Compared with the prior art, the belt-transmission angle attachment head of the present invention has the following advantages. The servo motor is arranged longitudinally (in a vertical state) and drives the spindle via the reducer and the belt-transmission structure in a manner that the spindle is in the space of the extension line of the servo motor output shaft, and thus, the space occupied by the servo motor and the spindle is reduced, and the volume of the angle attachment head is reduced, so that the spindle can enter a narrow space. Meanwhile, because the belt-transmission structure can drive the spindle to swing, a deep cavity can be easily machined, and moreover, the structure has advantages such as simple structure, convenient assembly and maintenance, and low manufacturing cost.

In the figure: 1. housing, 11. spindle mounting portion, 12. spindle accommodating space, 13. spindle mounting end, 14. angle measuring system accommodating cavity, 20. servo motor, 21. reducer, 22. driving wheel, 23. transmission belt, 24. driven wheel, 30. spindle, 31. rotating shaft, 310. fixed plate, 32. bearing, 4. clamping device, 5. angle measuring system, 50. circular grating, 51. reading head.

DESCRIPTION OF EMBODIMENTS

Figure 1:
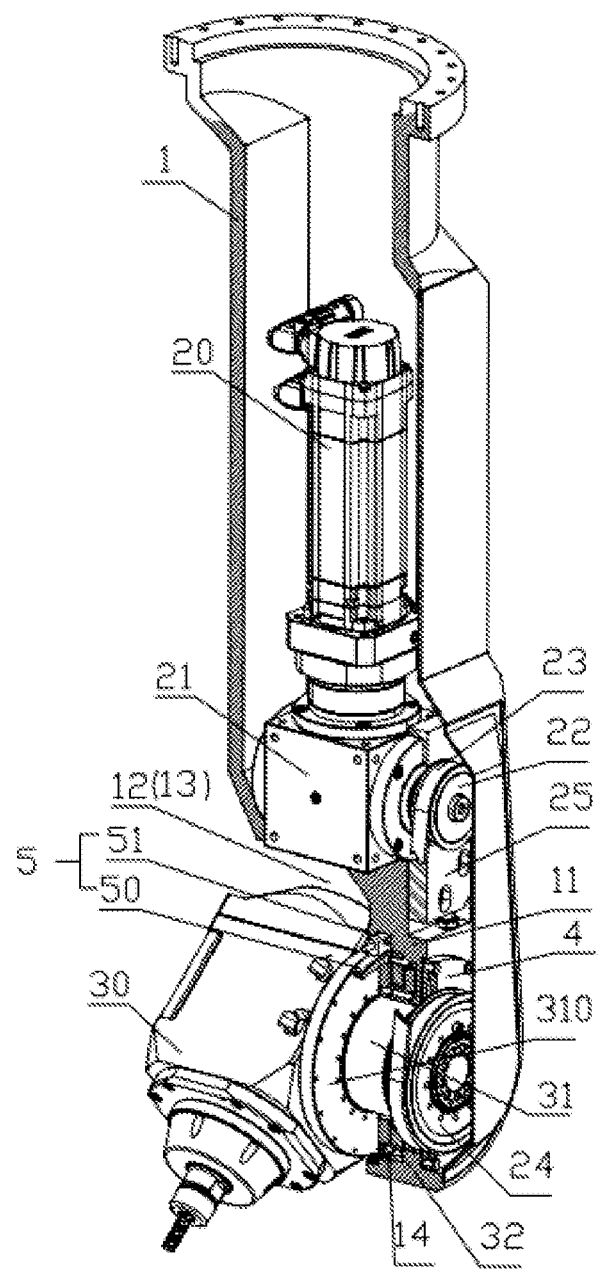
FIG. 1 is a structural diagram of a belt-transmission angle attachment head provided by the present invention.
Figure 2:
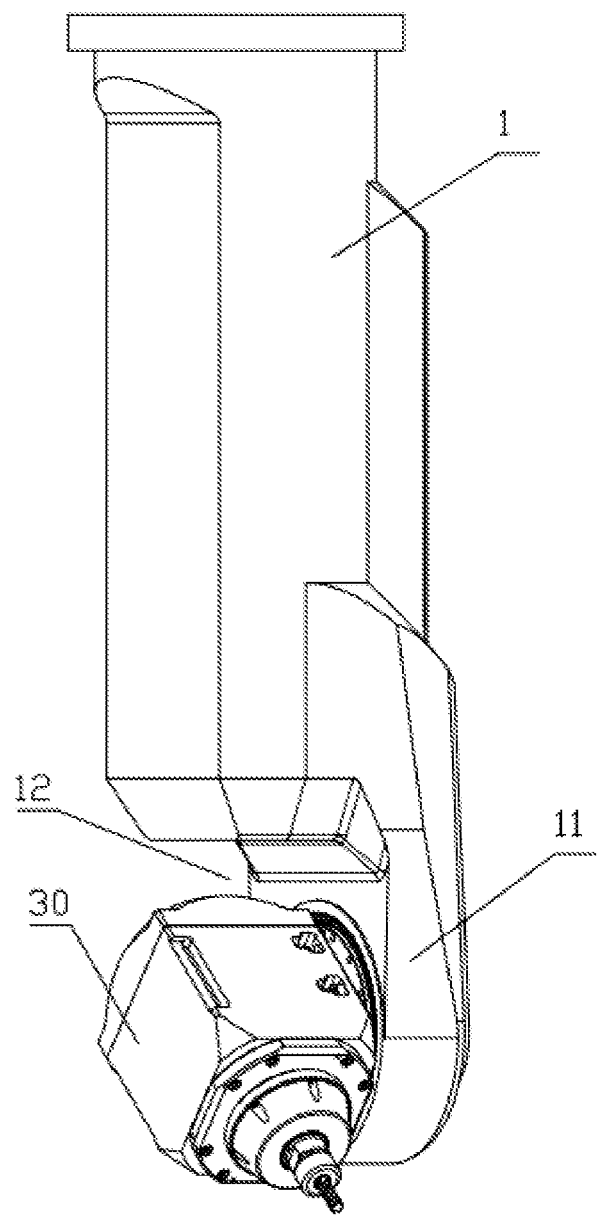
FIG. 2 is a main view of the belt-transmission angle attachment head provided by the present invention.

As shown in FIG. 1 and FIG. 2, the belt-transmission angle attachment head disclosed by the present invention includes a housing 1, a power mechanism, a transmission mechanism and a spindle 30; the power mechanism and transmission mechanism are arranged in the housing 1; as shown in the figure, in this embodiment, the housing 1 is a long and narrow cavity structure, an end of the housing 1 (the lower end in the figure) is provided with a spindle mounting portion 11, the spindle mounting portion 11 deviates from the central position of the housing (that is, the spindle mounting portion is arranged on the side portion of the lower end of the housing), and a spindle accommodating space 12 where the spindle can be arranged is formed between the lower portion of the housing and the spindle mounting portion.

Figure 3:
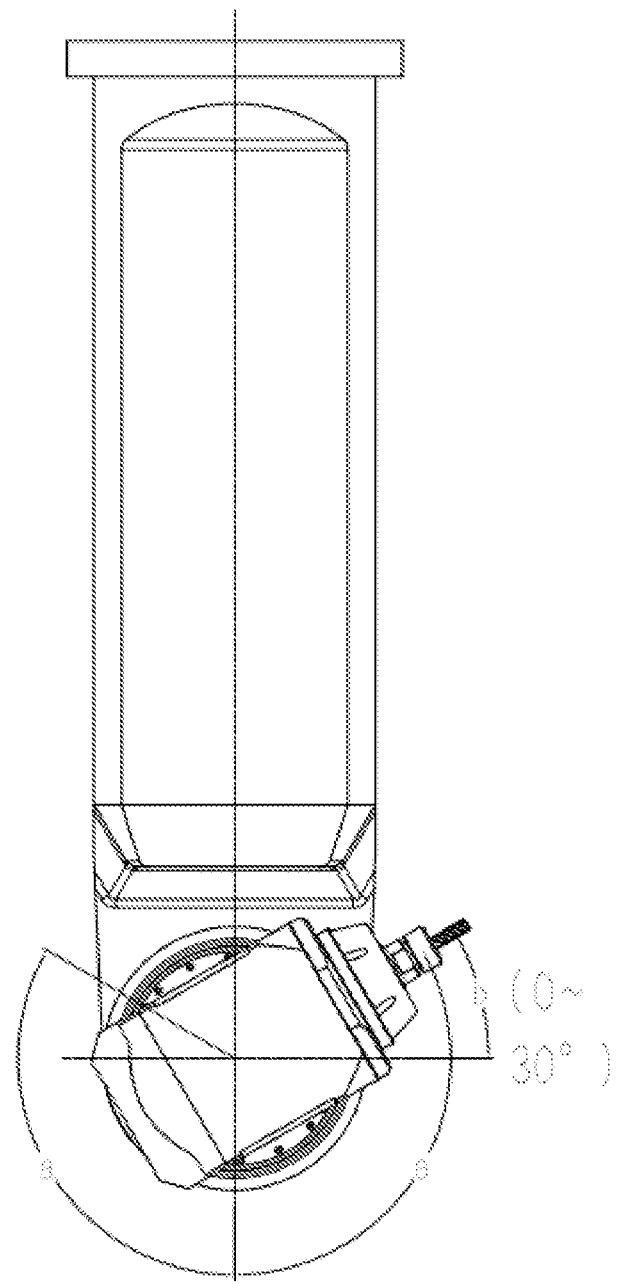
FIG. 3 is a schematic diagram of a range of a swinging angle that can be achieved by the belt-transmission angle attachment head provided by the present invention.

The power mechanism and transmission mechanism are mounted in the housing 1; specifically, the power mechanism includes a servo motor 20 and a reducer 21, the servo motor 20 is longitudinally arranged in the housing 1 (that is, the output shaft of the servo motor is in the same direction as the length direction of the housing), the output shaft of the servo motor 20 is connected to the input shaft of the reducer 21, and the input shaft of the reducer 21 is vertically arranged with respect to the output shaft of the reducer 21; the transmission mechanism includes a driving wheel 22, a transmission belt 23 and a driven wheel 24, and the driving wheel 22 is mounted on the output shaft of the reducer 21; the spindle 30 is arranged in the spindle accommodating space 12, a side wall of the spindle 30 is fixed to an end of a rotating shaft 31, and in this embodiment, an end of the rotating shaft 31 is provided with a fixed plate 310 (flange structure), the spindle 30 is fixedly connected to the fixed plate 310 via a bolt, the spindle mounting portion 11 is provided with a bearing mounting hole, a bearing 32 is mounted on the rotating shaft 31, the bearing 32 is mounted in the bearing mounting hole, a driven wheel 24 is mounted on the other end of the rotating shaft 31, and the driving wheel 22 and the driven wheel 24 are connected via a transmission belt 23. The spindle is mounted on the housing via the rotating shaft, so that the servo motor and the spindle are located on the same side of the transmission mechanism (that is, the spindle is located in the extended direction of the servo motor output shaft). In the present invention, by arranging the servo motor longitudinally, and by driving the spindle via the reducer whose input shaft and output shaft are vertical to each other and a belt-transmission mechanism, the servo motor, the reducer and the spindle are approximately arranged on a straight line, and thus, the width of the angle attachment head can be reduced, so that the spindle is arranged to have a narrow and long structure for easy penetration into deep cavities, and meanwhile, the servo motor can drive the spindle to swing around the central axis of the rotating shaft via the reducer and the belt-transmission structure. As shown in FIG. 3, when the length of the spindle mounting portion is long enough, that is, when the spindle does not interfere with the housing during the swing, the spindle can swing at a large angle. The figure shows that the angle a at which the attachment head can swing in both directions can reach 90 to 120 degrees, that is, the swinging angle of the spindle can reach 180 degrees to 240 degrees, and the spindle can swing cross the horizontal line and swing upward at an angle b up to 30 degrees, facilitating deep cavity machining. The transmission mechanism can adopt friction type belt transmission (structure of flat belt, V belt, etc.), and in this embodiment, the transmission structure adopts meshing type belt transmission (synchronous belt structure transmission), and the transmission using the synchronous belt structure can ensure the accuracy of the transmission.

Further, the side of the spindle mounting portion 11 provided with the driven wheel 24 is also mounted with a clamping device 4 for clamping the spindle, and the clamping device 4 is arranged between the spindle mounting portion 11 and the driven wheel 24. Preferably, the clamping device 4 is a pneumatic shaft clamping device, and the pneumatic shaft clamping device is mounted on the spindle mounting portion and sleeved on the rotating shaft. By setting the clamping device 4, the rotating shaft can be clamped and unclamped, and then the spindle can be clamped and unclamped, so that when the spindle rotates, the clamping device can release the rotating shaft. The spindle swing is controlled by a transmission shaft. When the spindle swings to a certain angle, the clamping device clamps the rotating shaft to facilitate the machining of the spindle. In this embodiment, the pneumatic shaft clamping device is used to ensure that the attachment head is clean and free of hydraulic oil pollution.

Further, an end of the rotating shaft 31 connected to the spindle 30 is provided with the fixed plate 310, the rotating shaft 31 is fixedly connected to the spindle 30 via the fixed plate 310, an angle measuring system 5 for measuring the spindle swinging angle is mounted on a side of the fixed plate 310 facing the driven wheel 24, and the angle measuring system 5 adopts a circular induction synchronizer. In this embodiment, the angle measuring system 5 includes a circular grating 50 and a reading head 51, the circular grating 50 is mounted on the fixed plate 310, and the reading head 51 is mounted on the spindle mounting portion 11. By setting the angle measuring system, the detection of the swinging angle of the spindle can be realized, so as to realize the closed-loop control of the spindle and improve the swinging accuracy of the spindle. Meanwhile, because the circular grating is mounted on the fixed plate (close to the bearing attachment), the rotation accuracy is high and is not affected by the cutting force of the spindle and the tension force of the transmission belt at the input end, and the swinging angle of the spindle can be measured directly, improving the positioning accuracy.

Further, a side of the spindle mounting portion 11 facing the spindle 30 is also provided with an angle measuring system accommodating cavity 14; the reading head 51 is mounted on an inner wall of the angle measuring system accommodating cavity 14; and the circular grating 50 is mounted on the fixed plate 310, and in the direction of the axis of the rotating shaft, part of the circular grating 50 is arranged in the angle measuring system accommodating cavity 14. Due to the setting of the angle measuring system accommodating cavity, the angle measuring system can be arranged therein, further reducing the width of the attachment head and facilitating the machining of deep cavity structures.

The above description is only a preferred embodiment of the present invention, but the protection scope of the present invention is not limited to this. Any equivalent replacements or changes made by a person skilled in the art within the technical scope disclosed by the present invention according to the technical solution of the present invention and the inventive concept thereof should be within the protection scope of the present invention.

The invention claimed is:

1. A belt-transmission angle attachment head, comprising: a housing; a power mechanism; a transmission mechanism; and a spindle, with the power mechanism and transmission mechanism arranged in the housing, wherein:
    the power mechanism includes a servo motor and a reducer, the servo motor is connected to the reducer, and an input shaft of the reducer is vertically arranged with respect to an output shaft of the reducer;
    the transmission mechanism includes a driving wheel, a transmission belt and a driven wheel, and the driving wheel is mounted on the output shaft of the reducer;
    the housing comprises a cavity, wherein the power mechanism and the transmission mechanism are disposed within the cavity,
    one side of an end of the housing is provided with a spindle mounting portion, the spindle mounting portion is offset from a central portion of the housing, and a spindle accommodating space where the spindle can be arranged is formed between a lower portion of the housing and the spindle mounting portion,
    the spindle is disposed within the spindle accommodation space,
    a side of the spindle is mounted on the housing via a rotating shaft, an end of the rotating shaft away from the spindle is mounted with the driven wheel, the spindle and the driven wheel are arranged on different sides of the spindle mounting portion, the driving wheel and the driven wheel are connected via the transmission belt, and the spindle and the power mechanism are located on the same side of the transmission mechanism, and the spindle is positioned such that a direction extended in the longitudinal direction of the output shaft of the servo motor and from the output shaft of the servo motor intersects the spindle, and the servo motor, the reducer, and the spindle are arranged approximately on a straight line.

2. The belt-transmission angle attachment head according to claim 1, wherein: a side of the spindle mounting portion provided with the driven wheel is also mounted with a clamp device for clamping the spindle; and the clamp device is arranged between the spindle mounting portion and the driven wheel.

3. The belt-transmission angle attachment head according to claim 2, wherein: the clamp device is a pneumatic shaft clamp device.

4. The belt-transmission angle attachment head according to claim 1, wherein: an end of the rotating shaft connected to the spindle is provided with a fixed plate; the rotating shaft is fixedly connected to the spindle via the fixed plate; and a side of the fixed plate facing the driven wheel is mounted with an angle measuring system for measuring a swinging angle of the spindle.

5. The belt-transmission angle attachment head according to claim 4, wherein: the angle measuring system includes a circular grating and a reading head; the circular grating is mounted on the fixed plate; and the reading head is mounted on the spindle mounting portion.

6. The belt-transmission angle attachment head according to claim 5, wherein: a side of the spindle mounting portion facing the spindle is provided with an angle measuring system accommodating cavity; the reading head is mounted on an inner wall of the angle measuring system accommodating cavity; and the circular grating is mounted on the fixed plate, and part of the circular grating is arranged in the angle measuring system accommodating cavity.

\* \* \* \* \*